(12) United States Patent
Shah et al.

(10) Patent No.: US 7,775,452 B2
(45) Date of Patent: Aug. 17, 2010

(54) SERIAL COMMUNICATING HVAC SYSTEM

(75) Inventors: Rajendra K. Shah, Indianapolis, IN (US); Jerry D. Ryan, Indianapolis, IN (US)

(73) Assignee: Carrier Corporation, Syracuse, NY (US)

( * ) Notice: Subject to any disclaimer, the term of this patent is extended or adjusted under 35 U.S.C. 154(b) by 1060 days.

(21) Appl. No.: 10/752,626

(22) Filed: Jan. 7, 2004

(65) Prior Publication Data
US 2005/0145705 A1 Jul. 7, 2005

(51) Int. Cl.
*G05D 23/00* (2006.01)
(52) U.S. Cl. .............................. 236/51; 62/129; 700/276
(58) Field of Classification Search ................... 62/175, 62/298, 126, 127, 129, 130; 236/51, 94; 165/11.1; 700/276
See application file for complete search history.

(56) References Cited
U.S. PATENT DOCUMENTS 4,811,897 A * 3/1989 Kobayashi et al. ............ 236/51
4,829,779 A * 5/1989 Munson et al. ............... 62/175
4,997,029 A * 3/1991 Otsuka et al. ................. 236/94
5,323,385 A * 6/1994 Jurewicz et al. ............. 370/300
5,853,123 A * 12/1998 Okano et al. .................. 62/175
7,243,004 B2 * 7/2007 Shah et al. .................... 700/276

* cited by examiner

*Primary Examiner*—Marc E Norman
(74) *Attorney, Agent, or Firm*—Carlson, Gaskey & Olds

(57) ABSTRACT

An HVAC system is provided with control communication over a serial data bus. In this manner, the hard wired controls of the prior art are eliminated. A thermostat includes a central control microprocessor that communicates control signals to and from a microprocessor at an indoor unit. The indoor unit may be a furnace or a fan/heater combination. The microprocessor on the indoor unit is operable to receive signals from the central control microprocessor and control the indoor unit accordingly. Moreover, the microprocessor at the indoor unit is operable to pass control signals on to an outdoor unit such as an air conditioner or heat pump. Most preferably, this outdoor unit is provided with its own microprocessor. Further, other peripheral units may be incorporated to be controlled over the same data bus from the thermostat. Installation and updating of HVAC systems is greatly simplified by this control arrangement.

29 Claims, 2 Drawing Sheets

SERIAL COMMUNICATING HVAC SYSTEM

BACKGROUND OF THE INVENTION

This invention relates to a heating, ventilating and air conditioning (IVAC) system wherein several interconnected units communicate control signals to and from each other over a communication bus.

HVAC systems are becoming increasingly complicated. As these systems increase in complexity, and sophistication of control, the number of wires that are hard-wired between the system components and controls increase. As an example, traditional residential HVAC systems have a thermostat on the wall of the home that allows a user to set a desired operating mode and temperature. There is also typically an indoor unit (a gas furnace or a heater/fan) and an outdoor unit (air conditioner or heat pump). Even this simple system illustrates the problem mentioned above.

HVAC systems operate on a simple control protocol. Based upon user-desired settings at the thermostat, and actual room temperature, command signals are sent to the indoor and/or outdoor equipment to perform heating, cooling, or fan functions. In the majority of the present systems, each of these functions requires a dedicated wire to run between the thermostat and the respective piece of equipment. The thermostat switches on a 24 volt AC signal over the wires to command the equipment to turn on a desired function, and removes the 24 volt AC signal to turn off the function.

Some systems have extended this protocol to include an additional wire for carrying fault information from one piece of equipment back to the thermostat, and displaying fault information to the user of the HVAC system. As residential systems become more sophisticated, multiple stages of heating and cooling are becoming common. Here again, the traditional protocol has been extended to include an additional wire for each equipment stage. New functions, such as controlling humidity, are also being integrated into thermostats. Again, each function has typically required its own wire.

As an example, one thermostat currently manufactured by the assignee of this application includes the ability to connect up to 11 wires. Two of the wires provide the 24 volt power, and two of the wires extend to an outdoor air temperature sensor. Seven other wires control various functions at the indoor and outdoor HVAC units. As an example, separate wires are required to turn on the indoor unit and to move it between various speeds or stages. These 11 wires do not include any of the "feedback" or status information as mentioned above. To provide this feedback would require even more wires. As can be appreciated, this results in a very complex installation, as each of the 11 wires must be attached at the correct location on the thermostat. Each of the seven control wires provide a single control function. As the number of wires grows, so does the installation complexity and possibility of mis-wiring. Compounding this problem, each combination of equipment (fan or furnace, AC or heat pump, one-stage or multi-stage, humidifier or not, etc.) has a different wiring arrangement. All of this can be challenging for a less experienced residential HVAC installer. This can lead to poor installation, resulting in degraded performance, malfunction, or service calls.

In many existing homes, the above challenges are complicated in that there are only four wires run through the wall to the thermostat at set-up. It may be difficult or impossible to run extra wires to upgrade functionality.

Some systems have included somewhat more sophisticated controls. As an example, the assignee of the present application developed a thermostat control which communicates multiple control signals over two control wires to a main control panel. However, the main control panel is still hardwired to the indoor and/or outdoor units. As such, there is still the problem mentioned above with regard to an undue number of wires.

Thus, a simplified system would be desirable that addresses the above-referenced problems and allows for easy system upgrade.

SUMMARY OF THE INVENTION

In the disclosed embodiment of this invention, at least a thermostat, and an indoor unit have electronic controls. The controls from these units communicate over four wires, with control signals being sent on two of the wires, and power being provided on the other two wires. An unlimited number of different control signals can be sent over the two control wires. Further, peripheral controls such as zone dampers, remote access modules, etc. also may have controls that communicate over the four-wire bus as mentioned above. The disclosed systems use microprocessors for the controls.

The disclosed communication of control signals is serial in nature, and enables virtually unlimited flow of information through the system. As disclosed, the thermostat provides a central control and initiates all communication, and sends all system commands to the respective equipment controls.

The indoor unit may be provided with controls that can provide information to existing outdoor units, and peripherals such as humidifiers that operate on the traditional hardwire protocol, and do not have built-in communicating capability (i.e., a dedicated microprocessor). Peripheral units with a dedicated control may also have the ability to interface with other hardwired peripheral units. As such, in its broadest scope, the present invention includes a central control in a thermostat, wherein the thermostat can receive user-desired settings, and communicate several distinct control signals to an indoor unit over two wires. The control signals are communicated over a communication bus, directly to a microprocessor that controls the indoor unit.

These and other features of the present invention can be best understood from the following specification and drawings, the following of which is a brief description.

DETAILED DESCRIPTION OF THE PREFERRED EMBODIMENT

Figure 1:
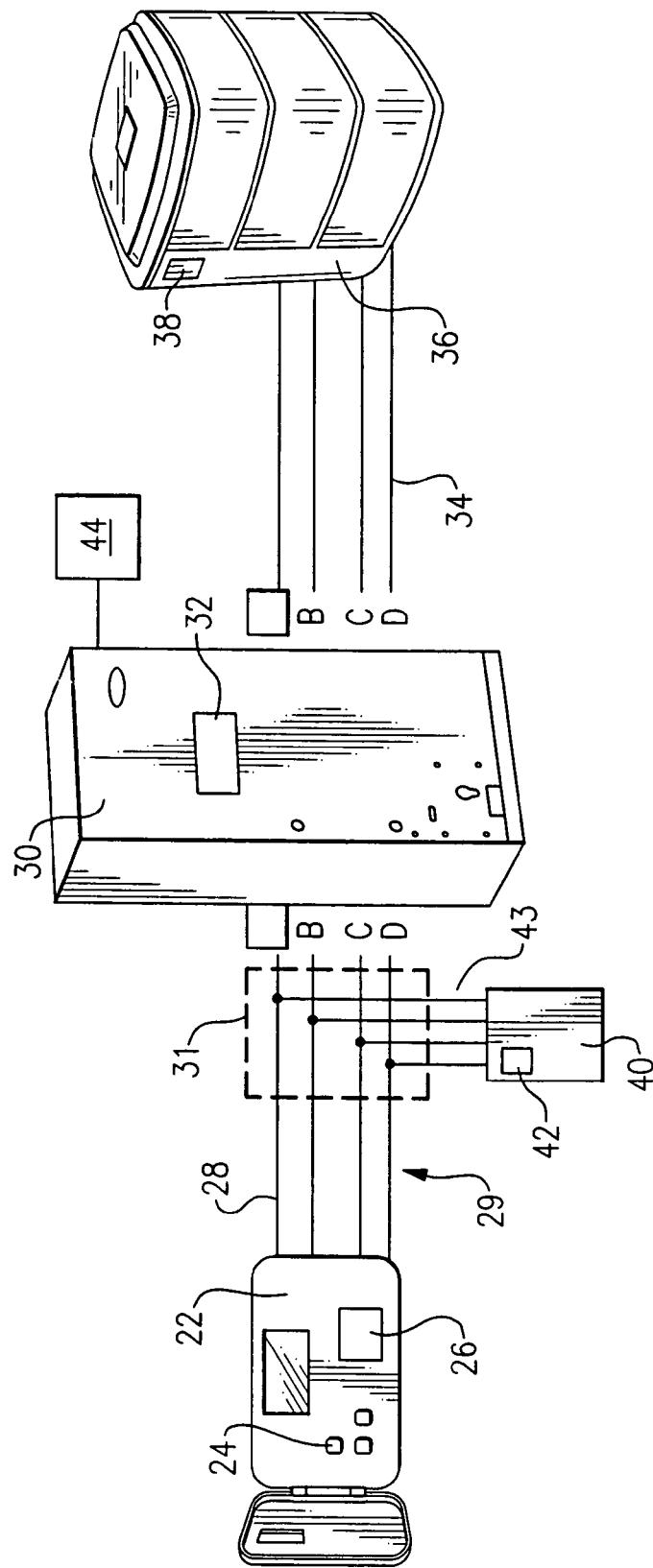
FIG. 1 schematically shows a system according to the present invention.

FIG. 1 is a simplified illustration of a basic IFVAC system 20 including the inventive serial communication, and incorporating a thermostat 22 having user input settings 24, as known. A microprocessor 26 is incorporated into the thermostat 22. The microprocessor 26 is both a bus master and a system master, in that the thermostat microprocessor 26 initiates all communication between the various units as will be described below. Further, the microprocessor 26 issues all commands to the respective units, again as will be explained below. Microprocessor 26 makes these command decisions based upon user settings, as well as other information it receives back from the respective units. In general, the control decisions made by the microprocessor 26 are as known in the art. The present invention is directed to how these signals are communicated between the microprocessor 26 and the associated units.

Four wires 28A-28D provide a data bus 29 to communicate microprocessor 26 to a microprocessor 32 at an indoor unit, such as a furnace control, or a fan/heater control. As shown, other peripheral units may communicate through the microprocessor 32 at indoor unit 30 and back to the microprocessor 26 at thermostat 22. An example of a peripheral unit would be a humidifier 44, which may not have its own microprocessor control.

A peripheral unit 40, such as a damper control module having a microprocessor 42 is shown communicating with the data bus 29, and then to microprocessor 26 through four wires 43A-D. Wires 43A-D are connected to wires 28A-D, as known, such as at a routing or junction box 31.

The humidifier 44 is shown as an existing type peripheral that will be hard-wired to communicate with the microprocessor 32, and then to microprocessor 26, over data bus 29 (wires 28A-28D). Microprocessor 26 will in turn send control signals back for the humidifier 44. The microprocessor 32 is provided with control function that allows it to control a hard-wired humidifier, based upon signals received from microprocessor 26. Alternatively, and with further development in HVAC systems generally, humidifiers that are controlled over the same four wire data bus 29 may be developed and incorporated into the system. Again, the microprocessor 26 would then be fully functional to control that new microprocessor at the humidifier 44.

The data bus (29, 31) is wired such that two of the wires, e.g., C and D, carry 24 volt AC power originating from the indoor unit 30 to power all other controls in the system. The other two wires, A and B, are used for system-wide communication and control.

Also, as known, the thermostat is provided with a room temperature sensor, and optionally may be provided with a humidity sensor, and a digital display. Also, among the information communicated could be identity codes such that microprocessor 26 can identify a reporting unit, status and fault information, as well as the standard feedback normally provided by such units to a system control. As can be appreciated, the signals communicated over the system are provided with codes or identifiers such that they are properly routed and identified. Protocols to achieve this goal are known.

Since the units are all connected by the same simple wiring scheme, wires A-D, it is relatively easy for the installer to properly install the various units. Moreover, since only four wires are required, the problem mentioned above with regard to incorporating more sophisticated HVAC systems into existing structures having only four wires leading to the thermostat is eliminated.

Another set of wires 34A-34D communicates microprocessor 32 to an outdoor unit 36, and its microprocessor 38. As mentioned above, the microprocessor 32 at the indoor unit 30 is also capable of controlling a hard-wired outdoor unit.

When a user inputs desired environmental conditions into the controls 24 at the thermostat 22, the microprocessor 26 sends appropriate control signals over the data bus 29 to the indoor unit 30, and "peripherals" (i.e., damper control 40). From indoor unit 30, the signal may be sent serially to outdoor unit 36, and "peripheral" 44.

Figure 2:
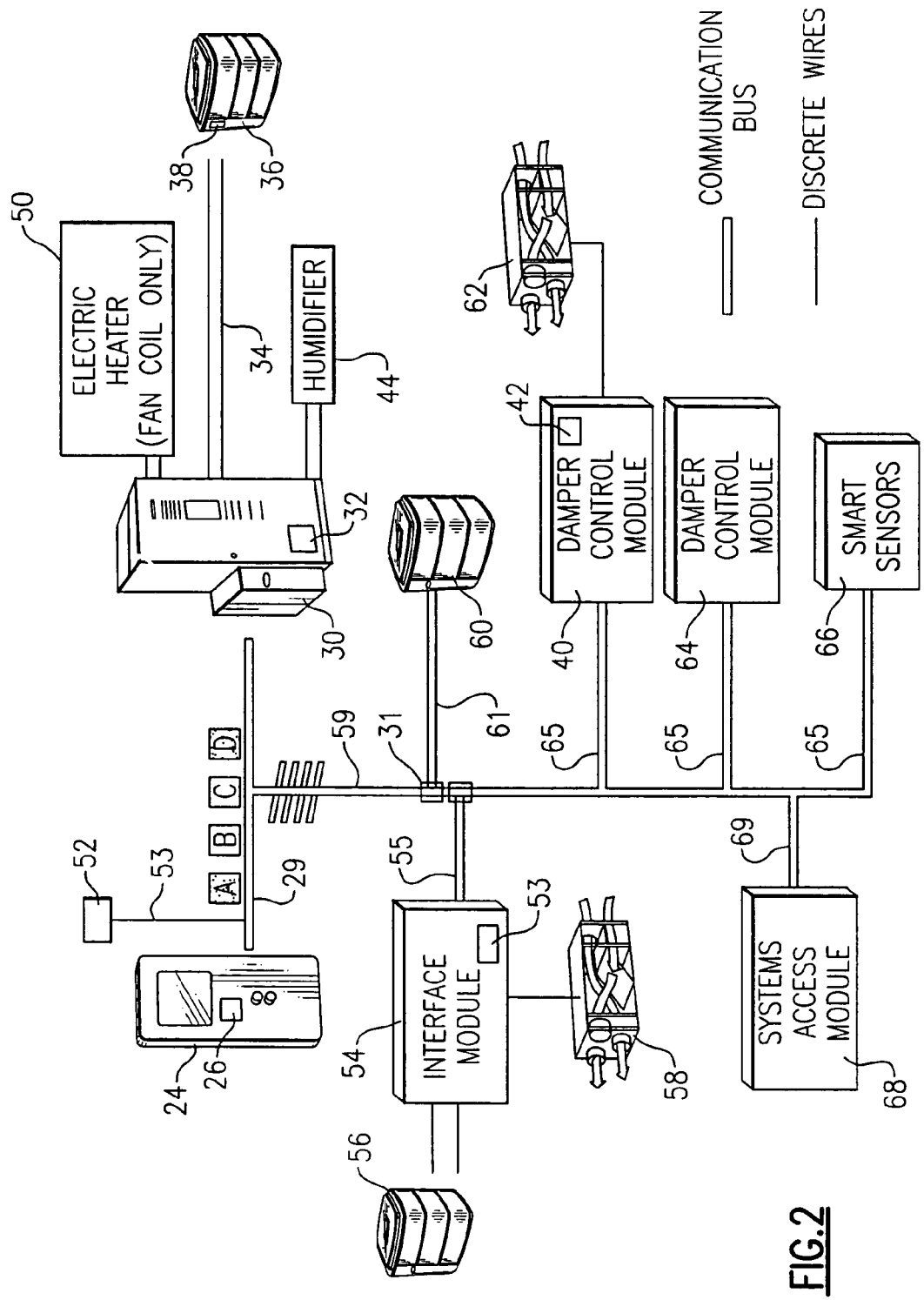
FIG. 2 schematically shows a system according to this invention.

While FIG. 1 shows a basic arrangement that may come within this invention. FIG. 2 shows the power of the invention to provide various options.

As shown in FIG. 2, thermostat 24 communicates with the indoor unit 30 over the data bus 29. An electric heater 50 may be hard wired to the indoor unit 30 that if the indoor unit 30 is a fan coil and control. The fan coil control is operable to control the electric heater. As one example of an interface between a fan coil control and an electric heater, see co-pending U.S. patent application Ser. No. 10/707,524, entitled "Identification of Electric Heater Capacity," filed Dec. 19, 2003. The entire disclosure of this application is incorporated herein by reference. As known, a fan coil and heater can also providing cooling.

Data bus 34 may communicate the microprocessor 32 at the indoor unit 30 to a control 38 on outdoor unit 36. Further, a hard-wired "dumb" humidifier that is controlled by the microprocessor 32 at the indoor unit 30 may be connected to the microprocessor 32. As disclosed above, the outdoor unit 36 could also be controlled by the microprocessor 32.

As shown also in FIG. 2, a remote sensor 52 may communicate directly with the thermostat 24. The data bus 53 connecting this remote sensor 52 to the thermostat 24 may be connected to the data bus 29 such as at a junction box, etc. Such a remote sensor may be utilized in the same room as the thermostat, when it is desired to have a temperature sensor in the room, but the thermostat concealed, such as in a closet, etc. As further shown, the outdoor unit 60 may be directly connected to a data bus 59, branched from data bus 29 through data bus 61. Appropriate junction or attachments 31 connect bus 59 to data bus 29, and bus 61 to bus 59. Such a connection may be utilized when the outdoor unit has its own microprocessor control, but for any number of reasons, it is desirable to wire the outdoor unit directly into the bus 59, rather than through the indoor unit 30 (such as if the indoor and outdoor units are remote from each other within the building).

As shown, damper control module 40 has a microprocessor 42 and may provide a control function for a "dumb" ventilator 62. Here again, the microprocessor 42 at the damper control module 40 is provided with control instructions for controlling the "dumb" ventilator. As shown, it is preferably a hard-wired connection between the ventilator and microprocessor 42 within the damper control module 40. As is known, a damper control module takes in control signals and opens or closes dampers to control the flow of air into various rooms within a building.

Of course, other damper control modules such as 64 may be simply directly connected via a data bus 65 to the data bus 59.

Smart sensors 66 may include a microprocessor 67, and be connected over a data bus 65 to the data bus 59. Again, with each of the data busses 65, some junction 31 may be utilized to communicate the two.

An access module 68 may also be connected into the data bus 59, through its own data bus 69. As known, an access module allows remote access to the HVAC system. Of course, as would be understood by a worker of ordinary skill in this art, any data bus 61, 65, 69 could also be connected directly to the data bus 29, rather than through a branch data bus 59.

One other feature provides additional freedom of design. An interface module 54 can basically incorporate a microprocessor control 53 to communicate with "dumb" outdoor units, ventilators, etc. Essentially, the interface module 54 microprocessor 53 is provided with controls for one or more of the "dumb" units (56, 58). Interface module 54 communicates over a data bus 55 with data bus 59.

The microprocessors associated with each of the units are provided with built-in software to communicate back to the thermostat microprocessor 26, and to interpret and act upon instructions from microprocessor 26. Again, all of this control may be as known in the art. It is how the control signals are communicated that is novel. Also, although microprocessors are disclosed, other type controls capable of performing the disclosed functions may be used.

While four wires A-D are illustrated, it should be understood that the invention could be provided by other arrangements. As an example, the control function could be provided by a co-ax wiring having an inner and outer wire to provide the control communication. For purposes of this application, such a co-ax wire would provide two of the four wires. Also, while the central control is disclosed in the thermostat, it could also be a separate control, or at some other component, such as on the indoor unit.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An HVAC system comprising:
a thermostat incorporating a central control, and operator input switches;
a data bus communicating control signals from said central control to an indoor HVAC unit, said indoor HVAC unit being operable to provide a heating function to air within an environment, said indoor HVAC unit being provided with a control that directly controls said indoor HVAC unit, and which receives control signals on said data bus from said central control.

2. The HVAC system as set forth in claim 1, wherein an outdoor HVAC unit is provided with its own control, and said outdoor HVAC unit control communicating with said central control over said data bus.

3. The HVAC system as set forth in claim 2, wherein said outdoor HVAC unit is one of an air conditioner and a heat pump.

4. The HVAC system as set forth in claim 1, wherein at least one peripheral HVAC unit includes its own control, and communicates through said indoor HVAC unit control to provide control signals to and from said central control.

5. The HVAC system as set forth in claim 1, wherein four wires communicate said indoor HVAC unit control to said central control, with two of said wires carrying power, and two of said wires carrying said control signals with a plurality of distinct signals being sent over said two wires carrying control signals.

6. The HVAC system as set forth in claim 1, wherein at least one peripheral unit is hard-wired to said indoor HVAC unit control, and said indoor HVAC unit control being designed to include control information for said at least one peripheral unit.

7. The HVAC system as set forth in claim 1, wherein an interface module is provided with a control to communicate with said data bus from an associated HVAC unit that does not have a control capable of receiving control signals over said data bus, said interface module being hard-wired to said associated HVAC unit, and said interface module being provided with control information for controlling said associated HVAC unit.

8. The HVAC system as set forth in claim 1, wherein a remote sensor generally communicates with said central control over said data bus.

9. The HVAC system as set forth in claim 1, wherein said central control and said indoor HVAC unit control are both microprocessors.

10. The HVAC system as set forth in claim 1, wherein said control signals include an identifier for routing information for said data bus.

11. The HVAC system as set forth in claim 1, wherein said indoor HVAC unit is one of a furnace and a fan/heater unit.

12. An HVAC system comprising:
a data bus including four wires communicating signals from a central control to a control for an indoor HVAC unit, said data bus including two control wires carrying a plurality of distinct control signals and two power wires carrying power, said indoor HVAC unit providing a power source for providing power over said two power wires, said central control being a system control for generating and sending controls signals to said indoor HVAC unit control, said indoor HVAC unit being operable to provide heating and a fan function to move air within an environment; and
an outdoor HVAC unit provided with four wires, with two power wires carrying power signals, and two control wires carrying a plurality of distinct control signals from said outdoor HVAC unit to said central control, said central control providing control signals to said outdoor HVAC unit control to operate said outdoor HVAC unit.

13. The HVAC system as set forth in claim 12, wherein at least one peripheral unit is hard-wired to said indoor unit control, said indoor HVAC unit control being designed to include control information for said at least one peripheral unit.

14. The HVAC system as set forth in claim 13, wherein said at least one peripheral unit is a humidifier.

15. The HVAC system as set forth in claim 12, wherein at least one peripheral unit incorporating a control controlling its functions, said at least one peripheral unit control communicating with said central control over four wires, with two power wires and two control wires carrying controls signals from said central control to said at least one peripheral unit control.

16. The HVAC system as set forth in claim 15, wherein said at least one peripheral unit is a damper control module.

17. The HVAC system as set forth in claim 15, wherein said at least one peripheral unit is a sensor for sensing a condition in a room, said sensor providing signals to said central control over said two control wires.

18. The HVAC system as set forth in claim 12, wherein said outdoor HVAC unit control communicates with said central control serially through said indoor HVAC unit control.

19. The HVAC system as set forth in claim 12, wherein said outdoor HVAC unit control and said indoor HVAC unit control separately connect into said data bus to communicate to said central control.

20. The HVAC system as set forth in claim 12, wherein an interface module is provided with a control to communicate with said data bus from an associated HVAC unit that does not have a control capable of receiving control signals over said data bus, said interface module being hard-wired to said associated HVAC unit, and said interface module being provided with control information for controlling said associated HVAC unit.

21. The HVAC system as set forth in claim 12, wherein said central control, said indoor HVAC unit control and said outdoor HVAC unit control are all microprocessors.

22. The HVAC system as set forth in claim 12, wherein said control signals include an identifier for routing information for said data bus.

23. The HVAC system as set forth in claim 12, wherein said four wires are provided by four distinct and separate wires.

24. The HVAC system as set forth in claim 12, wherein said indoor HVAC unit is one of a furnace and a fan/heater unit.

25. The HVAC system as set forth in claim 12, wherein said outdoor HVAC unit is one of an air conditioner and a heat pump.

26. An HVAC system comprising:
a central control;
a thermostat having operator input switches;
an indoor HVAC unit being operable to provide a heating function to air within an environment, said indoor HVAC unit being provided with a control that directly controls said HVAC unit; and
a data bus communicating control signals from said central control to and from said thermostat and at least to said indoor HVAC unit, said indoor HVAC unit receiving control signals on said data bus from said central control and signals from said operator input switch being passed to said central control to generate control for said indoor HVAC unit over said data bus.

27. The HVAC system as set forth in claim 26, wherein said indoor HVAC unit is one of a furnace and a fan/heater unit.

28. The HVAC system as set forth in claim 26, wherein an outdoor HVAC unit is provided with its own control and said outdoor HVAC unit control communicating with said central control over said data bus.

29. The HVAC system as set forth in claim 28, wherein said outdoor HVAC unit is one of an air conditioner and a heat pump.

* * * * *